United States Patent [19]

Rodewald et al.

[11] B 3,925,251

[45] Dec. 9, 1975

[54] ANTIMONY PENTAFLUORIDE HYDROCARBON CONVERSION CATALYST

[75] Inventors: Paul G. Rodewald, Rocky Hill; Darrell D. Whitehurst, Titusville, both of N.J.

[73] Assignee: Mobil Oil Corporation, New York, N.Y.

[22] Filed: Nov. 21, 1973

[21] Appl. No.: 418,153

[44] Published under the Trial Voluntary Protest Program on January 28, 1975 as document no. B 418,153.

[52] U.S. Cl. ............... 252/441; 252/449; 208/116; 260/683.68; 423/335
[51] Int. Cl.$^2$ .......................................... B01J 27/12
[58] Field of Search ........... 252/441, 449; 423/335; 260/683.68; 208/116

[56] References Cited
UNITED STATES PATENTS

| | | | |
|---|---|---|---|
| 3,394,202 | 7/1968 | Oelderik | 252/441 X |
| 3,607,044 | 9/1971 | List et al. | 252/449 X |

*Primary Examiner*—Patrick P. Garvin
*Attorney, Agent, or Firm*—Charles A. Huggett; Raymond W. Barclay

[57] ABSTRACT

This invention relates to a solid heterogeneous catalyst resulting from deposition of antimony pentafluoride vapor on silica prepared by pyrolysis of methylated silica and hydrocarbon conversion in the presence of such catalyst.

3 Claims, No Drawings

ANTIMONY PENTAFLUORIDE HYDROCARBON CONVERSION CATALYST

BACKGROUND OF THE INVENTION

1. Field of the Invention

This invention pertains to a new hydrocarbon conversion catalyst and to its use in catalytically effecting conversion of hydrocarbons.

2. Description of the Prior Art

Catalysts have heretofore been reported composed of $SbF_5$—HF or $SbF_5$—$HSO_3F$ supported on an inert material such as activated charcoal or graphite. U.S. Pat. No. 3,678,120 describes such catalysts and their use in hydrocarbon conversion.

The $SbF_5$—HF and $SbF_5$—$HSO_3F$ complexes previously utilized have required careful preparation and control of the amount of each of the components making up the complex. The latter is apparently physically adsorbed on the surface of the inert carbonaceous support rather than being chemically bound thereto.

Moreover, the use of siliceous materials, such as silica as a support has not been possible with the aforenoted complexes due to undesirable interaction therebetween with accompanying destruction of the surface area of the intended support.

SUMMARY OF THE INVENTION

In accordance with the present invention, there is provided a catalyst capable of effecting conversion of hydrocarbons at ambient temperature. The catalyst composition constituting the invention is readily prepared by heating silica gel at a temperature between about 200°C. and about 400°C. in a stream of methanol vapor followed by heating to a temperature within the approximate range of 600° to 850°C. in an inert atmosphere. The resulting material is cooled to a temperature within the approximate range of 150° to 200°C. and loaded by entrainment of antimony pentafluoride vapor with an inert gas. Pyrolysis of the methylated silica is believed to produce Si—H, Si—OH and Si. groups on the silica surface which upon subsequent contact with $SbF_5$ leads to interaction resulting in formation of catalytic sites.

The silica gel employed in preparing the support may be any of the commercially available materials. Generally, the silica gel used has a particle size in the approximate range of 20–100 mesh and is characterized by porosity and surface properties typified, for example, by a surface area of about 340 square meters/grams, an average pore diameter of 140 Angstroms and a pore volume of 1.15 cc/gram.

The silica gel is heated at a temperature between about 200° and about 400°C. in an inert gas stream containing methanol vapor. Passage of methanol vapor over the heated silica gel is continued for a period of time generally between about 10 and about 20 hours or longer to yield a resulting methylated silica. The product so obtained is then heated in an inert gaseous stream, such as helium, nitrogen or argon at a temperature within the approximate range of 600° and 850°C. Heating at such elevated temperature is carried out until evolution of gaseous products is complete, generally for a period of between about 1 and about 3 hours.

The resulting material is then cooled to a temperature below about 200°C. and usually within the range of about 150° to about 200°C. The material, maintained at a temperature within the latter range, is then loaded by entrainment of antimony pentafluoride vapor admixed with an inert gas such as helium, nitrogen, or argon. In some instances, improved catalyst systems may be achieved by initial saturation of the treated silica with hydrogen or by silylation of the silica with a suitably silylating agent such as dialkoxyalkyl silane or dialkoxylalkyl fluorosilane prior to contact with the antimony pentafluoride. The concentration of antimony pentafluoride contained in the gaseous stream is between about 1 and about 50 percent by volume. Contact between the siliceous support and the antimony pentafluoride vapor-inert gas stream is maintained for a sufficient period of time to deposit between about 5 and about 30 weight percent of antimony pentafluoride based on the siliceous support. Preferably, the amount of antimony pentafluoride combined with the siliceous support is between about 10 and about 20 weight percent of the support.

The catalyst prepared, as described above, has been found to be extremely active in effecting conversion of hydrocarbons. Thus, it has been found that the catalyst is useful in effecting conversion of hydrocarbons at temperatures substantially lower than those utilized in prior art processes. Using the present catalyst, conversion of hydrocarbons can be achieved at room temperature.

A wide variety of hydrocarbon conversion reactions may be effected utilizing the present catalyst. Such conversion processes include those catalyzed by the presence of acidic sites such as cracking, isomerization, alkylation, polymerization, disproportionation, dealkylation, transalkylation and similar related processes. These processes are effected by contacting a hydrocarbon or hydrocarbon mixture with the above-described catalyst at hydrocarbon conversion conditions. The catalyst to hydrocarbon weight ratio employed is generally between about 1:5 and about 1:20. The temperature employed is generally between 0° and about 650°C. Contact between the catalyst and hydrocarbon charge may take place utilizing any of the conventional systems such as a fixed bed system, a moving bed system, a fluidized bed system or a continuous or batch-type operation. The hydrocarbon conversion utilizing the present catalyst may be carried out as either a vapor phase, a liquid phase or a mixed phase operation. Conversion may take place in the absence or presence of hydrogen. Operation in the presence of hydrogen is particularly advantageous for isomerization in preserving catalyst life.

Isomerization of isomerizable hydrocarbons, such as naphthenes and/or paraffins, may be effectively carried out utilizing the catalyst of this invention. Thus, isomerization of straight chain or slightly branched chain paraffins containing 4 or more carbon atoms per molecule, such as normal butane, normal pentane, normal hexane, normal heptane, normal octane, may be easily effected at room temperature. Likewise, cycloparaffins containing at least 5 carbon atoms in the ring, such as alkyl cyclopentanes and cyclohexanes may be effectively isomerized at low temperature utilizing the present catalyst. It is contemplated that straight or branched chain saturated hydrocarbons containing up to 30 carbon atoms or more per molecule may be isomerized with the present catalyst, regardless of the source of such hydrocarbons or mixtures containing the same.

In carrying out isomerization of isomerizable hydrocarbons utilizing the present catalyst, contact between the catalyst and hydrocarbon charge is conducted at a temperature between about 0° and about 100°C. and preferably between about 20° and about 40°C., at a pressure between about atmospheric and about 20 atmospheres or more. The hydrocarbon charge is passed over the catalyst at a liquid hourly space velocity generally between about 0.5 and about 10 and preferably between about 1 and about 4. The resulting product is withdrawn from a reaction zone, separated from the reactor effluent and recovered by any suitable means such as fractional distillation. Any unreacted starting material may be recycled to form a portion of the feed stock.

The catalyst of this invention is also suitable for catalyzing hydrocarbon cracking. The hydrocarbon charge in such process may comprise one or more normal paraffins or may be a complex mixture of paraffins, naphthenes and aromatics, such as occurs in petroleum gas oil, which is the feed stock normally conducted to a commercial catalytic cracking unit. Hydrocarbon cracking utilizing the catalyst of this invention is generally conducted at a temperature between about 400° and about 650°C., a pressure of from about atmospheric to about 5 atmospheres and employing a liquid hourly space velocity of between about 0.5 and about 100.

The described catalyst is also useful for hydrocracking and in such instances may have combined therewith a hydrogenation component containing a Group VIII metal, e.g., nickel, platinum or palladium. Hydrocracking using such catalyst is carried out at a temperature between about 150° and about 250°C., a pressure between about atmospheric and about 70 atmospheres, employing a liquid hourly space velocity between about 0.5 and about 10.

DESCRIPTION OF SPECIFIC EMBODIMENTS

The following tabulated examples were carried out at room temperature utilizing a catalyst prepared by heating silica gel at 350°C. in a stream of methanol vapor followed by heating to 750°C. in a helium stream, cooling to 160°C. and loading by entrainment of SbF$_5$ vapor with helium. The catalyst to hydrocarbon weight ratio employed was 1:5. The hydrocarbon and catalyst were combined under nitrogen in a vial. The vial was sealed with a rubber septum and agitated. The course of the reaction was followed by gas chromatography. Reaction times varied from five minutes for isomerization of tertiary paraffins to about 20 hours for the isomerization/cracking of n-hexane. Results are shown below.

| STARTING HYDROCARBON | CONVERSION (%) | REACTION TIME (HRS.) | PRODUCT DISTRIBUTION | (%) |
|---|---|---|---|---|
| Cyclohexane | 10 | 3 | Methylcyclopentane | 100 |
| cis-1,4-Dimethylcyclohexane | 95 | .17 | cis-1,3- and trans-1,4-Dimethylcyclohexane | 82 |
| | | | trans-1,3-Dimethylcyclohexane | 5.3 |
| | | | trans-1,2-Dimethylcyclohexane | 9.7 |
| | | | cis-1,2-Dimethylcyclohexane | 0.9 |
| | | | Unidentified | 1.6 |
| 3-Methylpentane | 84 | 20 | 2-Methylpropane | 7.3 |
| | | | 2-Methylbutane | 9.1 |
| | | | 2,2-Dimethylbutane | 5.0 |
| | | | 2,3-Dimethylbutane | 8.6 |
| | | | 2-Methylpentane | 49 |
| | | | 2,3-Dimethylpentane | 1.4 |
| | | | 2,4-Dimethylpentane | 2.4 |
| | | | n-Hexane | 2.6 |
| | | | 2-Methylhexane | 4.3 |
| | | | 3-Methylhexane | 3.1 |
| | | | Unidentified | 5.7 |
| 2,3-Dimethylbutane | 48 | 20 | 2-Methylpropane | 4.6 |
| | | | 2-Methylbutane | 4.3 |
| | | | 2,2-Dimethylbutane | 15 |
| | | | 2-Methylpentane | 47 |
| | | | 3-Methylpentane | 25 |
| | | | Methylcyclopentane | 1.0 |
| | | | Cyclohexane | 1.4 |
| | | | 2-Methylhexane | 0.6 |
| | | | Unidentified | 1.3 |
| n-Pentane | 12 | 1 | 2-Methylpropane | 18 |
| | | | 2-Methylbutane | 66 |
| | | | 2,2-Dimethylbutane | 0.9 |
| | | | 2,3-Dimethylbutane | 1.2 |
| | | | 2-Methylpentane | 4.9 |
| | | | 3-Methylpentane | 1.9 |
| | | | Cyclopentane | 1.9 |
| | | | Cyclohexane | 5.6 |
| n-Hexane | 6 | 3 | 2-Methylpropane | 1.6 |
| | | | 2-Methylbutane | 1.2 |
| | | | 2,2-Dimethylbutane | 4.8 |
| | | | 2,3-Dimethylbutane | 14 |
| | | | 2-Methylpentane | 52 |
| | | | 3-Methylpentane | 20 |
| | | | Cyclohexane | 5.9 |
| n-Heptane | 3 | 2 | 2-Methylpropane | 1.6 |
| | | | 3-Methylbutane | 0.7 |
| | | | 2,3-Dimethylpentane | 6.2 |
| | | | 2,4-Dimethylpentane | 12 |
| | | | 2-Methylhexane | 28 |
| | | | 3-Methylhexane | 13 |
| | | | Methylcyclohexane | 38 |

It is to be understood that the foregoing description is merely illustrative of preferred embodiments of the invention of which many variations may be made of those skilled in the art within the scope of the following claims without departing from the spirit thereof.

We claim:

1. A hydrocarbon conversion catalyst consisting essentially of antimony pentafluoride deposited on silica resulting from pyrolysis of methylated silica.

2. The catalyst of claim 1 wherein the amount of deposited antimony pentafluoride is between about 5 and about 30 weight percent of the silica support.

3. The catalyst of claim 1 where the amount of deposited antimony pentafluoride is between about 10 and about 20 weight percent of the silica support.

* * * * *